(12) United States Patent
Karplus

(10) Patent No.: US 11,909,263 B1
(45) Date of Patent: *Feb. 20, 2024

(54) PLANAR ROTARY TRANSFORMER

(71) Applicant: Waymo LLC, Mountain View, CA (US)

(72) Inventor: Paul Karplus, Redwood City, CA (US)

(73) Assignee: Waymo LLC, Mountain View, CA (US)

(*) Notice: Subject to any disclaimer, the term of this patent is extended or adjusted under 35 U.S.C. 154(b) by 1152 days.

This patent is subject to a terminal disclaimer.

(21) Appl. No.: 16/355,672

(22) Filed: Mar. 15, 2019

Related U.S. Application Data

(63) Continuation of application No. 15/298,186, filed on Oct. 19, 2016, now Pat. No. 10,277,084.

(51) Int. Cl.
| | |
|---|---|
| *H02K 1/22* | (2006.01) |
| *H02K 3/28* | (2006.01) |
| *H02K 1/12* | (2006.01) |
| *H02K 11/20* | (2016.01) |

(52) U.S. Cl.
CPC .............. *H02K 1/22* (2013.01); *H02K 1/12* (2013.01); *H02K 3/28* (2013.01); *H02K 11/20* (2016.01)

(58) Field of Classification Search
CPC ................................ H02K 1/20; H02K 1/12
See application file for complete search history.

(56) References Cited

U.S. PATENT DOCUMENTS

| | | | |
|---|---|---|---|
| 2,512,325 | A | 6/1950 | Hansen, Jr. |
| 3,053,099 | A | 9/1962 | Bennett et al. |
| 3,060,337 | A | 10/1962 | Henry-Baudot |
| 3,069,912 | A | 12/1962 | Faux et al. |

(Continued)

FOREIGN PATENT DOCUMENTS

| | | |
|---|---|---|
| BE | 590087 | 8/1960 |
| DE | 3724349 A1 * | 2/1989 |

(Continued)

OTHER PUBLICATIONS

Oliver J. Woodman, "An introduction to inertial navigation," Technical Report, No. 696, University of Cambridge, UCAM-CL-TR-696, Aug. 2007.

(Continued)

*Primary Examiner* — Alexander Talpalatski
(74) *Attorney, Agent, or Firm* — McDonnell Boehnen Hulbert & Berghoff LLP

(57) ABSTRACT

One example device includes a rotor platform that rotates about an axis of rotation. The device also includes a rotor coil comprising a first plurality of conductive loops disposed along a planar mounting surface of the rotor platform. The device also includes a stator platform and a stator coil comprising a second plurality of conductive loops disposed along a planar mounting surface of the stator platform. The rotor coil and the stator coil are coaxially arranged about the axis of rotation. The stator coil remains within a first predetermined distance to the rotor coil in response to rotation of the rotor platform. The device also includes a magnetic core extending along the axis of rotation and through the stator coil. The magnetic core remains within a second predetermined distance to the stator coil in response to rotation of the rotor platform.

40 Claims, 6 Drawing Sheets

(56) References Cited

U.S. PATENT DOCUMENTS

| | | | |
|---|---|---|---|
| 3,091,715 A | 5/1963 | Henry-Baudot | |
| 3,096,455 A * | 7/1963 | Hahn | H02K 23/54 |
| | | | 310/233 |
| 3,153,165 A * | 10/1964 | Henry-Baudot | H02K 24/00 |
| | | | 310/268 |
| 3,231,771 A | 1/1966 | Henry-Baudot | |
| 3,829,659 A | 8/1974 | Margolis | |
| 4,223,300 A * | 9/1980 | Wiklund | H03M 1/305 |
| | | | 324/207.17 |
| 4,396,875 A | 8/1983 | Yamauchi | |
| 4,658,162 A | 4/1987 | Koyama et al. | |
| 4,733,115 A | 3/1988 | Barone et al. | |
| 4,990,812 A * | 2/1991 | Nam | H02K 19/16 |
| | | | 310/426 |
| 4,992,688 A * | 2/1991 | Cap | H02K 29/08 |
| | | | 310/71 |
| 5,067,084 A | 11/1991 | Kau | |
| 5,229,696 A * | 7/1993 | Golker | H02K 24/00 |
| | | | 318/400.38 |
| 5,498,919 A | 3/1996 | Bahn | |
| 5,553,176 A | 9/1996 | Demarco | |
| 5,859,510 A | 1/1999 | Dolan et al. | |
| 5,874,821 A | 2/1999 | Monleone | |
| 5,898,301 A | 4/1999 | La Croix et al. | |
| 5,922,039 A | 7/1999 | Welch et al. | |
| 6,128,426 A | 10/2000 | Einhorn | |
| 6,396,235 B1 | 5/2002 | Ellington et al. | |
| 6,401,036 B1 | 6/2002 | Geier et al. | |
| 6,535,114 B1 | 3/2003 | Suzuki et al. | |
| 6,703,724 B1 | 3/2004 | Hobson et al. | |
| 6,782,315 B2 | 8/2004 | Lu et al. | |
| 6,885,160 B2 | 4/2005 | Takeuchi | |
| 6,937,787 B2 | 8/2005 | Schilling et al. | |
| 6,941,205 B2 | 9/2005 | Hrovat et al. | |
| 6,988,570 B2 | 1/2006 | Takeuchi | |
| 7,112,910 B2 | 9/2006 | Lopatinsky et al. | |
| 7,112,956 B2 | 9/2006 | Shibata et al. | |
| 7,969,558 B2 | 6/2011 | Hall | |
| 8,126,298 B2 | 2/2012 | Stark | |
| 8,126,642 B2 | 2/2012 | Trepagnier et al. | |
| 8,344,571 B2 * | 1/2013 | Lee | H02K 21/222 |
| | | | 310/268 |
| 8,350,656 B2 | 1/2013 | Cullen et al. | |
| 8,672,337 B2 | 3/2014 | van der Knaap et al. | |
| 8,847,718 B2 | 9/2014 | Masters et al. | |
| 9,030,149 B1 | 5/2015 | Chen et al. | |
| 9,164,511 B1 | 10/2015 | Ferguson et al. | |
| 9,244,462 B2 | 1/2016 | Pederson | |
| 9,329,269 B2 | 5/2016 | Zeng | |
| 9,383,753 B1 | 7/2016 | Templeton et al. | |
| 9,482,530 B2 | 11/2016 | Norman et al. | |
| 9,793,046 B2 * | 10/2017 | Rozman | H01F 27/2804 |
| 9,835,719 B2 | 12/2017 | Nguyen | |
| 9,935,514 B1 | 4/2018 | Lenius et al. | |
| 10,031,232 B2 | 7/2018 | Zohar et al. | |
| 10,033,456 B2 | 7/2018 | Rosenband et al. | |
| 10,481,269 B2 | 11/2019 | Pacala et al. | |
| 10,502,574 B2 | 12/2019 | Robinson et al. | |
| 10,742,969 B1 | 8/2020 | Rohatgi et al. | |
| 10,785,474 B1 | 9/2020 | Semansky | |
| 10,796,453 B1 | 10/2020 | Yan et al. | |
| 10,818,036 B1 | 10/2020 | Lee et al. | |
| 2002/0175644 A1 | 11/2002 | Su | |
| 2003/0020353 A1 | 1/2003 | Lopatinsky et al. | |
| 2003/0038606 A1 | 2/2003 | Beishline | |
| 2003/0048028 A1 * | 3/2003 | Lee | H01R 39/24 |
| | | | 310/248 |
| 2003/0149512 A1 | 8/2003 | Hrovat et al. | |
| 2003/0197966 A1 * | 10/2003 | Yamazaki | G11B 20/10 |
| 2004/0189130 A1 | 9/2004 | Hovanky et al. | |
| 2004/0199300 A1 | 10/2004 | Gustafsson et al. | |
| 2004/0245957 A1 | 12/2004 | Shibata et al. | |
| 2005/0206254 A1 | 9/2005 | Tsuge et al. | |
| 2006/0055265 A1 | 3/2006 | Zalusky | |
| 2006/0080004 A1 | 4/2006 | Cheok et al. | |
| 2006/0202584 A1 | 9/2006 | Jore et al. | |
| 2007/0001512 A1 | 1/2007 | Sato et al. | |
| 2008/0018330 A1 | 1/2008 | Legrand et al. | |
| 2008/0042515 A1 | 2/2008 | Butterfield | |
| 2008/0225271 A1 | 9/2008 | Ohmura | |
| 2008/0252285 A1 | 10/2008 | Passwater et al. | |
| 2009/0033166 A1 | 2/2009 | Takeuchi et al. | |
| 2009/0195106 A1 | 8/2009 | Iki et al. | |
| 2009/0267434 A1 * | 10/2009 | Park | H02K 23/54 |
| | | | 310/81 |
| 2010/0067085 A1 | 3/2010 | Bernstein et al. | |
| 2010/0079101 A1 | 4/2010 | Sidman | |
| 2010/0198445 A1 | 8/2010 | O'Dea et al. | |
| 2011/0026938 A1 | 2/2011 | Lo et al. | |
| 2011/0216304 A1 | 9/2011 | Hall | |
| 2011/0241467 A1 | 10/2011 | Fujioka et al. | |
| 2011/0255070 A1 | 10/2011 | Phillips et al. | |
| 2012/0043862 A1 | 2/2012 | Furukawa et al. | |
| 2012/0080974 A1 | 4/2012 | Tanimoto | |
| 2012/0091847 A1 | 4/2012 | Fullerton et al. | |
| 2012/0119628 A1 * | 5/2012 | Schwery | H02K 11/20 |
| | | | 310/68 B |
| 2012/0126927 A1 | 5/2012 | Iwaya | |
| 2012/0133474 A1 | 5/2012 | Iwaya | |
| 2012/0237198 A1 | 9/2012 | Bowman | |
| 2013/0009508 A1 * | 1/2013 | Takamatsu | H02K 1/2796 |
| | | | 310/156.32 |
| 2013/0026888 A1 | 1/2013 | Migita et al. | |
| 2013/0300840 A1 | 11/2013 | Borowski | |
| 2013/0307366 A1 * | 11/2013 | Naginsky | H02K 21/24 |
| | | | 310/180 |
| 2013/0307367 A1 | 11/2013 | Yoshida et al. | |
| 2014/0160559 A1 | 6/2014 | Mermelstein et al. | |
| 2014/0265970 A1 | 9/2014 | Burke | |
| 2015/0025801 A1 | 1/2015 | Linton et al. | |
| 2015/0028783 A1 | 1/2015 | Sato | |
| 2015/0094911 A1 | 4/2015 | Munnix | |
| 2015/0115762 A1 | 4/2015 | Rozman et al. | |
| 2015/0116866 A1 | 4/2015 | Yeakley et al. | |
| 2015/0168953 A1 | 6/2015 | Smid | |
| 2015/0349609 A1 | 12/2015 | Tremelling et al. | |
| 2015/0364978 A1 | 12/2015 | Petkanchin | |
| 2016/0197573 A1 | 7/2016 | Iwata et al. | |
| 2016/0291134 A1 | 10/2016 | Droz et al. | |
| 2016/0328619 A1 | 11/2016 | Yi et al. | |
| 2017/0025931 A1 | 1/2017 | Endo et al. | |
| 2018/0076753 A1 | 3/2018 | Donolo | |
| 2018/0081061 A1 | 3/2018 | Mandai et al. | |
| 2018/0081361 A1 | 3/2018 | Robinson et al. | |
| 2018/0123412 A1 | 5/2018 | Karplus et al. | |
| 2018/0321360 A1 | 11/2018 | Hall et al. | |
| 2019/0011537 A1 | 1/2019 | Utermoehlen et al. | |
| 2019/0018416 A1 | 1/2019 | Gassend | |
| 2019/0023264 A1 | 1/2019 | Mizutani | |
| 2019/0179028 A1 | 6/2019 | Pacala et al. | |
| 2020/0106318 A1 | 4/2020 | Karplus et al. | |
| 2020/0122730 A1 | 4/2020 | Shimizu | |
| 2020/0142073 A1 | 5/2020 | Gassend et al. | |

FOREIGN PATENT DOCUMENTS

| | | |
|---|---|---|
| EP | 1 655 820 | 5/2006 |
| EP | 2 377 230 | 8/2013 |
| FR | 1224281 | 6/1960 |
| GB | 2485185 | 5/2012 |
| JP | S59-139850 | 8/1984 |
| JP | S60-125143 | 7/1985 |
| JP | S60-237831 | 11/1985 |
| JP | S61-210849 | 9/1986 |
| JP | H01-133547 | 5/1989 |
| JP | H01-134977 | 9/1989 |
| JP | H04-33579 | 2/1992 |
| JP | H05-084177 | 11/1993 |
| JP | H07-83665 | 3/1995 |
| JP | H07-327348 | 12/1995 |
| JP | 2000-300618 | 10/2000 |
| JP | 2008-011611 | 1/2008 |

(56) References Cited

FOREIGN PATENT DOCUMENTS

| JP | 2011-158926 | 8/2011 | |
|---|---|---|---|
| JP | 2012-120423 | 6/2012 | |
| KR | 10-0213572 | 8/1999 | |
| KR | 2012-0112979 | 10/2010 | |
| WO | WO-2009101405 A2 * | 8/2009 | ............ H01F 38/18 |
| WO | WO 2011/006515 | 1/2011 | |

OTHER PUBLICATIONS

I.P. Prikhodko et al., "Termal Calibration of Silicon MEMS Gyroscopes," IMAPS International Conference & Exhibition of Device Packaging, Mar. 5-8, 2012.

A. Pedersen, "On the Response of Interleaved Transformer Windings to Surge Voltages," IEEE Transactions on Power Apparatus and Systems, vol. 82, No. 66, pp. 349-356, Jun. 1963.

Mikel Choperena, "Rotor Temperature Monitoring with Wireless Battery-Free Sensors", Farsens, M2M and IoT, Motor/Generator Monitoring, Jan. 14, 2016.

Kazuya Shirahata, "Speed Control Methods of Various Types of Speed Control Motors," Oriental Motor Co., printed on Nov. 27, 2018.

International Search Report and Written Opinion from International Application No. PCT/US2017/053515, dated Dec. 12, 2017.

International Search Report and Written Opinion from International Application No. PCT/US2017/052415, dated Dec. 13, 2017.

* cited by examiner

PLANAR ROTARY TRANSFORMER

CROSS-REFERENCE TO RELATED APPLICATION

This application is a continuation of U.S. patent application Ser. No. 15/298,186 filed Oct. 19, 2016, the entire contents of which are incorporated herein by reference as if fully set forth in this application.

BACKGROUND

Unless otherwise indicated herein, the materials described in this section are not prior art to the claims in this application and are not admitted to be prior art by inclusion in this section.

Rotary joint devices are often used for transmission of power and/or electrical signals between one structure and another structure in an electromechanical system that operates by causing a relative rotation between the two structures (e.g., stator and rotor). Example systems that employ rotary joint devices include remote sensing systems (e.g., RADARs, LIDARs, etc.) and robotic systems (e.g., for directing microphones, speakers, robotic components, etc.), among others.

SUMMARY

In one example, a device includes a rotor platform that rotates about an axis of rotation. The rotor platform includes a rotor planar mounting surface and a rotor coil. The rotor coil comprises a first plurality of conductive loops disposed along the rotor planar mounting surface. The device also includes a stator platform that includes a stator planar mounting surface. The device also includes a stator coil comprising a second plurality of conductive loops disposed along the stator planar mounting surface. The rotor coil and the stator coil are coaxially arranged about the axis of rotation. The stator coil remains within a first predetermined distance to the rotor coil in response to rotation of the rotor platform about the axis of rotation. The device also includes a magnetic core extending along the axis of rotation and through the stator coil. The magnetic core remains within a second predetermined distance to the stator coil in response to rotation of the rotor platform about the axis of rotation.

In another example, a device comprises a first platform having a first side and a second platform having a second side positioned to overlap the first side. The device also comprises an actuator that rotates the first platform relative to the second platform and about an axis of rotation of the first platform. The first side remains within a first predetermined distance to the second side in response to the actuator rotating the first platform. The device also comprises a first coil included in the first platform. The first coil comprises a first plurality of conductive loops in a coplanar arrangement substantially parallel to the first side. The device also comprises a second coil included in the second platform. The second coil comprises a second plurality of conductive loops in a coplanar arrangement substantially parallel to the second side. The device also comprises a magnetic core extending through the first coil and the second coil. A surface of the magnetic core adjacent to the first coil remains within a second predetermined distance to the first coil in response to the actuator rotating the first platform.

In yet another example, a device includes a rotor platform and a rotor printed circuit board (PCB) mounted to the rotor platform. The rotor platform rotates about an axis of rotation. The device also includes a stator platform and a stator PCB mounted to the stator platform. The rotor PCB remains at a first predetermined distance to the stator PCB in response to rotation of the rotor platform about the axis of rotation. The device also includes a rotor coil comprising one or more conductive loops patterned along a single layer of the rotor PCB. The device also includes a stator coil comprising one or more conductive loops patterned along a single layer of the stator PCB. The rotor coil and the stator coil are concentrically arranged about the axis of rotation such that the rotor coil remains at least partially overlapping the stator coil responsive to rotation of the rotor platform about the axis of rotation. The device also includes a magnetic core extending through the rotor coil and the stator coil. A surface of the magnetic core remains at a second predetermined distance to the rotor coil and the stator coil responsive to rotation of the rotor coil about the axis of rotation.

These as well as other aspects, advantages, and alternatives, will become apparent to those of ordinary skill in the art by reading the following detailed description, with reference where appropriate to the accompanying figures.

DETAILED DESCRIPTION

Figure 1:
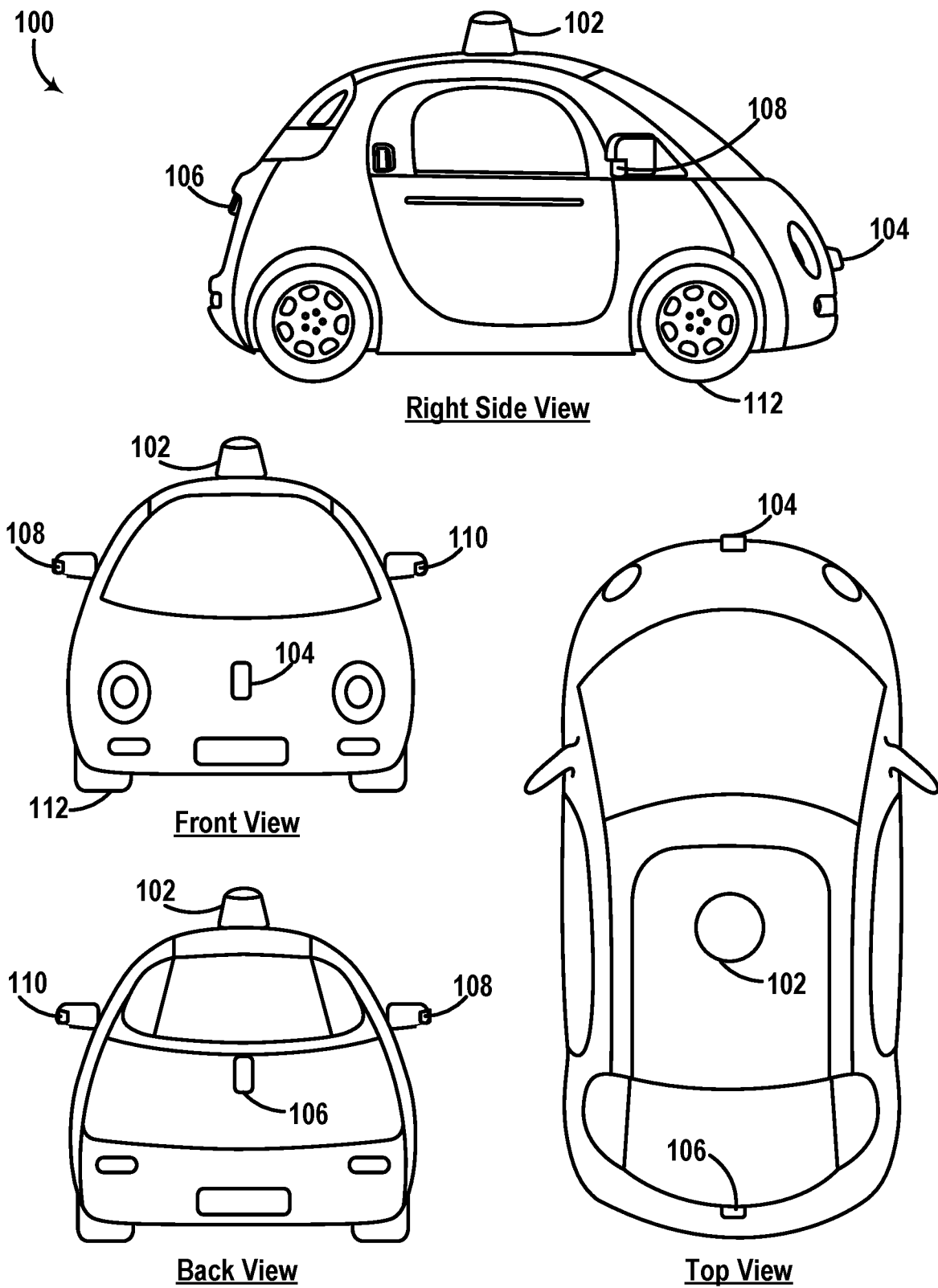
FIG. 1 illustrates a vehicle, according to an example embodiment.

The following detailed description describes various features and functions of the disclosed implementations with reference to the accompanying figures. In the figures, similar symbols identify similar components, unless context dictates otherwise. The illustrative implementations described herein are not meant to be limiting. It may be readily understood by those skilled in the art that certain aspects of the disclosed implementations can be arranged and combined in a wide variety of different configurations.

I. Overview

Within examples, a rotary joint device includes a rotary transformer configured to transmit power from a stator platform to a rotor platform of the device. The example rotary joint device includes two platforms arranged such that a first side of a first platform (one of the stator and rotor platforms) remains within a predetermined distance to a second side of a second platform (the other of the stator and rotor platforms) in response to a relative rotation between the two platforms. For instance, the two platforms may include circularly shaped disks arranged coaxially to maintain an overlap between the two respective sides (separated by the predetermined distance) in response to rotation of any of the two platforms about a common axis of the two platforms. Other configurations are possible as well.

In some implementations, the first platform may include a first coil comprising a first plurality of conductive loops in a coplanar arrangement substantially parallel to the first side of the first platform. For example, the first coil could be implemented as conductive traces or tracks patterned along a first layer of a circuit board (e.g., PCB, etc.) in the first platform. In some examples, the first coil may also include another plurality of conductive loops coupled to the first plurality of loops. For example, the circuit board may include multiple layers, and the other plurality of conductive loops could be implemented as conductive traces or tracks patterned along a second layer of the circuit board. In these examples, the device may also include an electrical contact (e.g., a via between the two circuit board layers) that electrically couples a single conductive loop in the first layer to an adjacent overlapping conductive loop in the second layer.

Additionally, in these implementations, the second platform may include a second coil comprising a second plurality of conductive loops in a coplanar arrangement substantially parallel to the second side of the second platform. For instance, the first coil and the second coil can be coaxially arranged about an axis of rotation of the first platform (or the second platform) such that the two coils remain overlapping at the predetermined distance to one another in response to a relative rotation between the two platforms.

Additionally, in some implementations, the device may also include a magnetic core (e.g., transformer core, ferrite material, etc.) that extends through the first coil and/or the second coil. A surface of the magnetic core adjacent to the first coil (and/or the second coil) may be configured to remain within a second predetermined distance to the first coil in response to a relative rotation between the two platforms. For example, the magnetic core may have a cylindrically shaped outer surface having a cylinder axis aligned with the axis of rotation. In this example, if the first platform rotates about the axis, then the outer surface of the magnetic core may remain separated by the second predetermined distance to the two coils.

With this arrangement, for example, the first coil and the second coil could form a rotary transformer for transmitting power from the second platform (e.g., stator) to the first platform (e.g., rotor), while the first platform is rotating relative to the second platform. Further, for example, a winding or coil design can be integrated directly onto a PCB that also includes or mounts other components such as optical communication components (e.g., light sources, photodetectors, etc.), sensors, etc. By doing so, for instance, the device may improve assembly efficiency for various rotary joint implementations. Further, for instance, the magnetic core could facilitate concentrating and/or increasing the magnetic flux between the two coils by positioning the outer surface of the core at a relatively small distance relative to the coils, while also maintaining a sufficiently larger distance between the two platforms to allow divergence of light used for optical communication between the two platforms. For example, a cross-sectional area of the stator platform that is illuminated by a light source in the rotor platform may increase as the distance between the two platforms increases. Thus, in some examples, the device may include optical communication components (e.g., light sources, etc.) mounted on a same platform (e.g., PCB) as the transformer coils.

Other example arrangements, configurations, and operations are possible as well and are described in greater detail within exemplary implementations herein.

II. Example Electromechanical Systems and Devices

Systems and devices in which example embodiments may be implemented will now be described in greater detail. In general, the embodiments disclosed herein can be used with any electromechanical system that includes a moveable component. An example system can provide for transmission of power and/or signals between the moveable component and other parts of the system. Illustrative embodiments described herein include vehicles that have moveable components such as sensors and wheels that communicate with other components of the vehicle and/or with one another. However, an example electromechanical system may also be implemented in or take the form of other devices, such as sensing platforms (e.g., RADAR platforms, LIDAR platforms, directional sensing platforms, etc.), robotic devices, industrial systems (e.g., assembly lines, etc.), medical devices (e.g., medical imaging devices, etc.), or mobile communication systems, among others. The term "vehicle" is broadly construed herein to cover any moving object, including, for instance, an aerial vehicle, watercraft, spacecraft, a car, a truck, a van, a semi-trailer truck, a motorcycle, a golf cart, an off-road vehicle, a warehouse transport vehicle, a farm vehicle, or a carrier that rides on a track (e.g., roller coaster, trolley, tram, train car, etc.), among other examples.

FIG. 1 illustrates a vehicle 100, according to an example embodiment. In particular, FIG. 1 shows a Right Side View, Front View, Back View, and Top View of the vehicle 100. Although vehicle 100 is illustrated in FIG. 1 as a car, as noted above, other types of vehicles are possible as well. Furthermore, although vehicle 100 can be configured to operate autonomously, the embodiments described herein are also applicable to vehicles that are not configured to operate autonomously or that are configured to operate semi-autonomously. Thus, vehicle 100 is not meant to be limiting. As shown, vehicle 100 includes five sensor units 102, 104, 106, 108, and 110, and four wheels, exemplified by wheel 112.

In some embodiments, sensor units 102-110 may include any combination of sensors, such as global positioning system sensors, inertial measurement units, radio detection and ranging (RADAR) units, cameras, laser rangefinders, light detection and ranging (LIDAR) units, or acoustic sensors, among other possibilities.

As shown, sensor unit 102 is mounted to a top side of the vehicle 100 opposite to a bottom side of the vehicle 100 where the wheel 112 is mounted. Further, sensor units 104-110 are respectively mounted to respective sides of vehicle 100 other than the top side. As shown, sensor unit 104 is positioned at a front side of vehicle 100, sensor 106 is positioned at a back side of vehicle 100, the sensor unit 108 is positioned at a right side of vehicle 100, and sensor unit 110 is positioned at a left side of vehicle 100.

Although sensor units 102-110 are shown to be mounted in particular locations on vehicle 100, in some embodiments, sensor units 102-110 can be mounted in other locations, either inside or outside vehicle 100. For example, although sensor unit 108 as shown is mounted to a rear-view mirror of vehicle 100, sensor unit 108 may alternatively be positioned in another location along the right side of vehicle 100. Further, while five sensor units are shown, in some embodiments more or fewer sensor units may be included in vehicle 100. However, for the sake of example, sensor units 102-110 are positioned as shown.

In some embodiments, one or more of sensor units 102-110 may include one or more movable mounts on which the sensors can be movably mounted. A movable mount may include, for example, a rotating platform. Alternatively or additionally, a movable mount may include a tilting platform. Sensors mounted on a tilting platform could be tilted within a given range of angles and/or azimuths, for example. A movable mount may take other forms as well.

In some embodiments, one or more of sensor units 102-110 may include one or more actuators configured to adjust a position and/or orientation of sensors in the sensor unit by moving the sensors and/or movable mounts. Example actuators include motors, pneumatic actuators, hydraulic pistons, relays, solenoids, and piezoelectric actuators, among others.

As shown, vehicle 100 includes one or more wheels such as wheel 112 that are configured to rotate to cause the vehicle to travel along a driving surface. In some embodiments, wheel 112 may include at least one tire coupled to a rim of wheel 112. To this end, wheel 112 may include any combination of metal and rubber, or a combination of other materials. Vehicle 100 may include one or more other components in addition to or instead of those shown.

Figure 2:
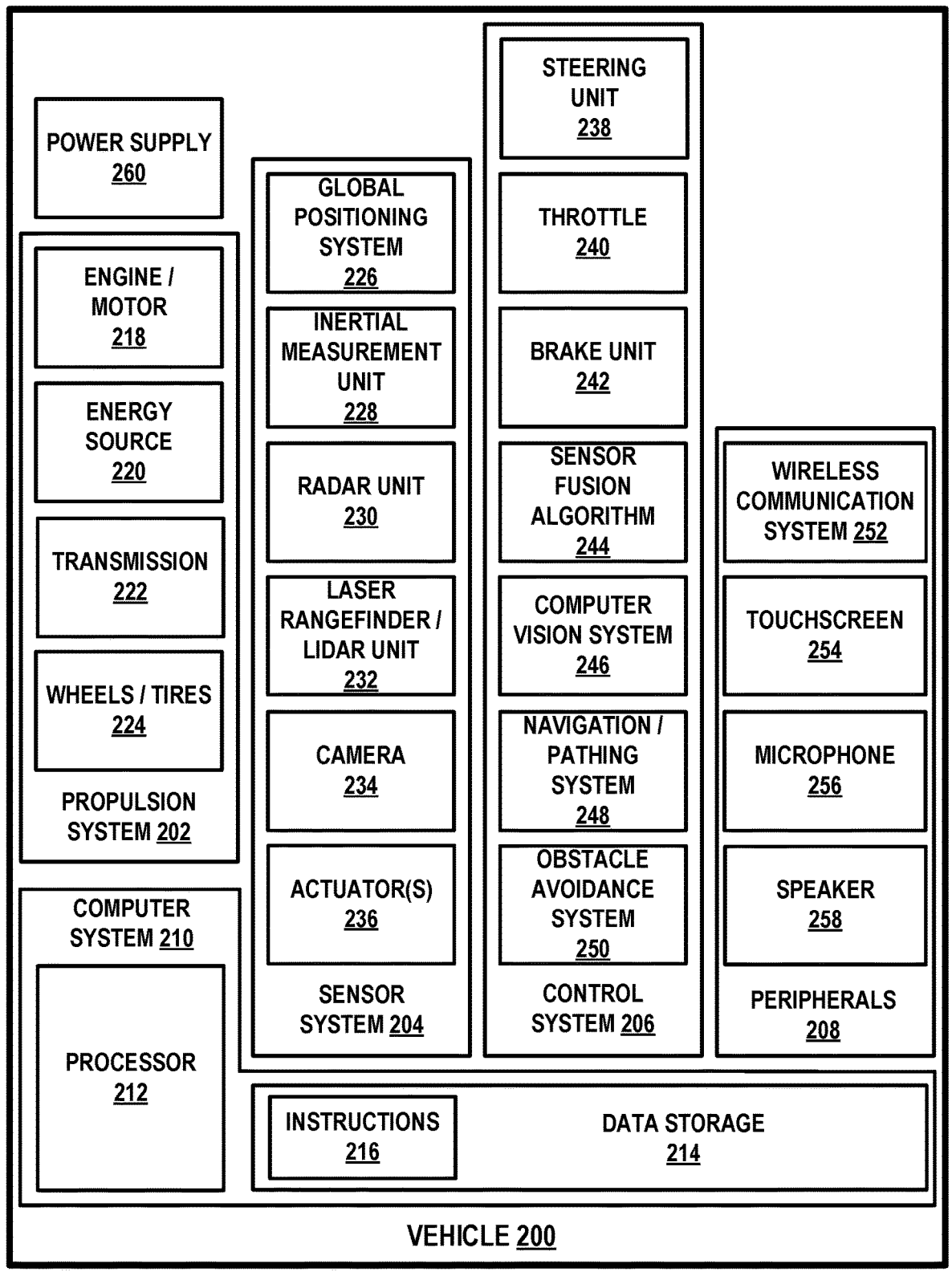
FIG. 2 is a simplified block diagram of a vehicle, according to an example embodiment.

FIG. 2 is a simplified block diagram of a vehicle 200, according to an example embodiment. Vehicle 200 may be similar to vehicle 100, for example. As shown, vehicle 200 includes a propulsion system 202, a sensor system 204, a control system 206, peripherals 208, and a computer system 210. In other embodiments, vehicle 200 may include more, fewer, or different systems, and each system may include more, fewer, or different components. Further, the systems and components shown may be combined or divided in any number of ways.

Propulsion system 202 may be configured to provide powered motion for the vehicle 200. As shown, propulsion system 202 includes an engine/motor 218, an energy source 220, a transmission 222, and wheels/tires 224.

Engine/motor 218 may be or include any combination of an internal combustion engine, an electric motor, a steam engine, and a Stirling engine. Other motors and engines are possible as well. In some embodiments, propulsion system 202 may include multiple types of engines and/or motors. For instance, a gas-electric hybrid car may include a gasoline engine and an electric motor. Other examples are possible.

Energy source 220 may be a source of energy that powers the engine/motor 218 in full or in part. That is, engine/motor 218 may be configured to convert energy source 220 into mechanical energy. Examples of energy sources 220 include gasoline, diesel, propane, other compressed gas-based fuels, ethanol, solar panels, batteries, and other sources of electrical power. Energy source(s) 220 may additionally or alternatively include any combination of fuel tanks, batteries, capacitors, and/or flywheels. In some embodiments, energy source 220 may provide energy for other systems of vehicle 200 as well.

Transmission 222 may be configured to transmit mechanical power from engine/motor 218 to wheels/tires 224. To this end, transmission 222 may include a gearbox, clutch, differential, drive shafts, and/or other elements. In embodiments where transmission 222 includes drive shafts, the drive shafts may include one or more axles that are configured to be coupled to wheels/tires 224.

Wheels/tires 224 of vehicle 200 may be configured in various formats, including a unicycle, bicycle/motorcycle, tricycle, or car/truck four-wheel format. Other wheel/tire formats are possible as well, such as those including six or more wheels. In any case, wheels/tires 224 may be configured to rotate differentially with respect to other wheels/tires 224. In some embodiments, wheels/tires 224 may include at least one wheel that is fixedly attached to transmission 222 and at least one tire coupled to a rim of the wheel that could make contact with a driving surface. Wheels/tires 224 may include any combination of metal and rubber, or combination of other materials. Propulsion system 202 may additionally or alternatively include components other than those shown.

Sensor system 204 may include any number of sensors configured to sense information about vehicle 200 and/or an environment in which vehicle 200 is located, as well as one or more actuators 236 configured to modify a position and/or orientation of the sensors. As shown, sensor system 204 includes a Global Positioning System (GPS) 226, an inertial measurement unit (IMU) 228, a RADAR unit 230, a laser rangefinder and/or LIDAR unit 232, and a camera 234. Sensor system 204 may include additional sensors as well, including, for example, sensors that monitor internal systems of vehicle 200 (e.g., an $O_2$ monitor, a fuel gauge, an engine oil temperature, etc.). Other sensors are possible as well. In some examples, sensor system 204 may be implemented as multiple sensor units each mounted to the vehicle in a respective position (e.g., top side, bottom side, front side, back side, right side, left side, etc.).

GPS 226 may include any sensor (e.g., location sensor) configured to estimate a geographic location of vehicle 200. To this end, for example, GPS 226 may include a transceiver configured to estimate a position of vehicle 200 with respect to the Earth. IMU 228 may include any combination of direction sensors configured to sense position and orientation changes of the vehicle 200 based on inertial acceleration. Example IMU sensors include accelerometers, gyroscopes, other direction sensors, etc.. RADAR unit 230 may include any sensor configured to sense objects in an environment in which vehicle 200 is located using radio signals. In some embodiments, in addition to sensing the objects, RADAR unit 230 may be configured to sense the speed and/or heading of the objects.

Laser rangefinder or LIDAR unit 232 may include any sensor configured to sense objects in the environment in which vehicle 200 is located using light. In particular, laser rangefinder or LIDAR unit 232 may include one or more light sources configured to emit one or more beams of light and a detector configured to detect reflections of the one or more beams of light. Laser rangefinder or LIDAR 232 may be configured to operate in a coherent (e.g., using heterodyne detection) or an incoherent detection mode. In some examples, LIDAR unit 232 may include multiple LIDARs, with each LIDAR having a particular position and/or configuration suitable for scanning a particular region of an environment around vehicle 200.

Camera 234 may include any camera (e.g., still camera, video camera, etc.) that can capture images of an environment of vehicle 200. Actuator(s) 236 may include any type of actuator configured to adjust a position, orientation, and/or pointing direction of one or more of the sensors of system 204. Example actuators include motors, pneumatic actuators, hydraulic pistons, relays, solenoids, and piezoelectric actuators, among other examples. Sensor system 204 may additionally or alternatively include components other than those shown.

Control system 206 may be configured to control operation of vehicle 200 and/or components thereof. To this end, control system 206 may include a steering unit 238, a throttle 240, a brake unit 242, a sensor fusion algorithm 244, a computer vision system 246, a navigation or pathing system 248, and an obstacle avoidance system 250.

Steering unit 238 may be any combination of mechanisms configured to adjust the heading of vehicle 200. Throttle 240 may be any combination of mechanisms configured to control the operating speed of engine/motor 218 and, in turn, the speed of vehicle 200. Brake unit 242 may be any combination of mechanisms configured to decelerate vehicle 200. For example, brake unit 242 may use friction to slow wheels/tires 224. In some examples, brake unit 242 may also convert kinetic energy of wheels/tires 224 to an electric current.

Sensor fusion algorithm 244 may be an algorithm (or a computer program product storing an algorithm) configured to accept data from sensor system 204 as an input. The data may include, for example, data representing information sensed at the sensors of sensor system 204. Sensor fusion algorithm 244 may include, for example, a Kalman filter, a Bayesian network, an algorithm for some of the functions of the methods herein, or any other algorithm. Sensor fusion algorithm 244 may further be configured to provide various assessments based on the data from sensor system 204, including, for example, evaluations of individual objects and/or features in the environment in which vehicle 100 is located, evaluations of particular situations, and/or evaluations of possible impacts based on particular situations.

Computer vision system 246 may be any system configured to process and analyze images captured by camera 234 in order to identify objects and/or features in the environment in which vehicle 200 is located, including, for example, traffic signals and obstacles. To this end, computer vision system 246 may use an object recognition algorithm, a Structure from Motion (SFM) algorithm, video tracking, or other computer vision techniques. In some embodiments, computer vision system 246 may additionally be configured to map the environment, track objects, estimate the speed of objects, etc.

Navigation and pathing system 248 may be any system configured to determine a driving path for vehicle 200. Navigation and pathing system 248 may additionally be configured to update the driving path dynamically while vehicle 200 is in operation. In some embodiments, navigation and pathing system 248 may be configured to incorporate data from sensor fusion algorithm 244, GPS 226, LIDAR unit 232, and/or one or more predetermined maps of the environment of vehicle 200, so as to determine a driving path for vehicle 200. Obstacle avoidance system 250 may be any system configured to identify, evaluate, and avoid or otherwise negotiate obstacles in the environment in which vehicle 200 is located. Control system 206 may additionally or alternatively include components other than those shown.

Peripherals 208 (e.g., input interface, output interface, etc.) may be configured to allow vehicle 200 to interact with external sensors, other vehicles, external computing devices, and/or a user. To this end, peripherals 208 may include, for example, a wireless communication system 252, a touchscreen 254, a microphone 256, and/or a speaker 258.

Wireless communication system 252 may be any system configured to wirelessly couple to one or more other vehicles, sensors, or other entities, either directly or via a communication network. To this end, wireless communication system 252 may include an antenna and a chipset for communicating with the other vehicles, sensors, servers, or other entities either directly or via a communication network. Chipset or wireless communication system 252 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. Wireless communication system 252 may take other forms as well.

Touchscreen 254 may be used by a user as an input interface to input commands to vehicle 200. To this end, touchscreen 254 may be configured to sense at least one of a position and a movement of a user's finger via capacitive sensing, resistance sensing, or a surface acoustic wave process, among other possibilities. Touchscreen 254 may be capable of sensing finger movement in a direction parallel or planar to the touchscreen surface, in a direction normal to the touchscreen surface, or both, and may also be capable of sensing a level of pressure applied to the touchscreen surface. Touchscreen 254 may be formed of one or more translucent or transparent insulating layers and one or more translucent or transparent conducting layers. Touchscreen 254 may take other forms as well.

Microphone 256 may be configured to receive audio (e.g., a voice command or other audio input) from a user of vehicle 200. Similarly, speakers 258 may be configured to output audio to the user of vehicle 200. Peripherals 208 may additionally or alternatively include components other than those shown.

Computer system 210 may be configured to transmit data to, receive data from, interact with, and/or control one or more of propulsion system 202, sensor system 204, control system 206, and peripherals 208. To this end, computer system 210 may be communicatively linked to one or more of propulsion system 202, sensor system 204, control system 206, and peripherals 208 by a system bus, network, and/or other connection mechanism (not shown).

In one example, computer system 210 may be configured to control operation of transmission 222 to improve fuel efficiency. As another example, computer system 210 may be configured to cause camera 234 to capture images of the environment. As yet another example, computer system 210 may be configured to store and execute instructions corresponding to sensor fusion algorithm 244. Other examples are possible as well.

As shown, computer system 210 includes processor 212 and data storage 214. Processor 212 may comprise one or more general-purpose processors and/or one or more special-purpose processors. To the extent processor 212 includes more than one processor, such processors could work separately or in combination. Data storage 214, in turn, may comprise one or more volatile and/or one or more non-volatile storage components, such as optical, magnetic, and/or organic storage among other possibilities, and data storage 214 may be integrated in whole or in part with processor 212.

In some embodiments, data storage 214 contains instructions 216 (e.g., program logic) executable by processor 212 to execute various vehicle functions. Data storage 214 may contain additional instructions as well, including instructions to transmit data to, receive data from, interact with, and/or control one or more of propulsion system 202, sensor system 204, control system 206, and/or peripherals 208. In some embodiments, data storage 214 also contains calibration data for one or more of the sensors in sensor system 204. For example, the calibration data may include a mapping between previously obtained sensor measurements and one or more predetermined inputs to the sensors. Computer system 210 may additionally or alternatively include components other than those shown.

Power supply 260 may be configured to provide power to some or all of the components of vehicle 200. To this end, power supply 260 may include, for example, a rechargeable lithium-ion or lead-acid battery. In some embodiments, one or more banks of batteries could be configured to provide electrical power. Other power supply materials and configurations are possible as well. In some embodiments, power supply 260 and energy source 220 may be implemented together as one component, as in some all-electric cars for instance.

In some embodiments, vehicle 200 may include one or more elements in addition to or instead of those shown. For example, vehicle 200 may include one or more additional interfaces and/or power supplies. Other additional components are possible as well. In such embodiments, data storage 214 may further include instructions executable by processor 212 to control and/or communicate with the additional components. Still further, while each of the components and systems are shown to be integrated in vehicle 200, in some embodiments, one or more components or systems can be removably mounted on or otherwise connected (mechanically or electrically) to vehicle 200 using wired or wireless connections.

III. Example Rotary Joint Configurations

Within examples, a rotary joint may be configured as an interface between two structures of an electromechanical system, in which one or both of the two structures is configured to rotate or otherwise move relative to the other structure. To that end, in some implementations, a portion of the rotary joint (e.g., rotor) may be coupled to one structure of the example system and another portion (e.g., stator) may be coupled to the other structure of the example system. Additionally or alternatively, in some implementations, the rotary joint may be included within a structure arranged between two structures that rotate (or move) with respect to one another. For instance, an example rotary joint could be disposed in a robotic joint that couples two robotic links. Other implementations are possible as well.

Figure 3:
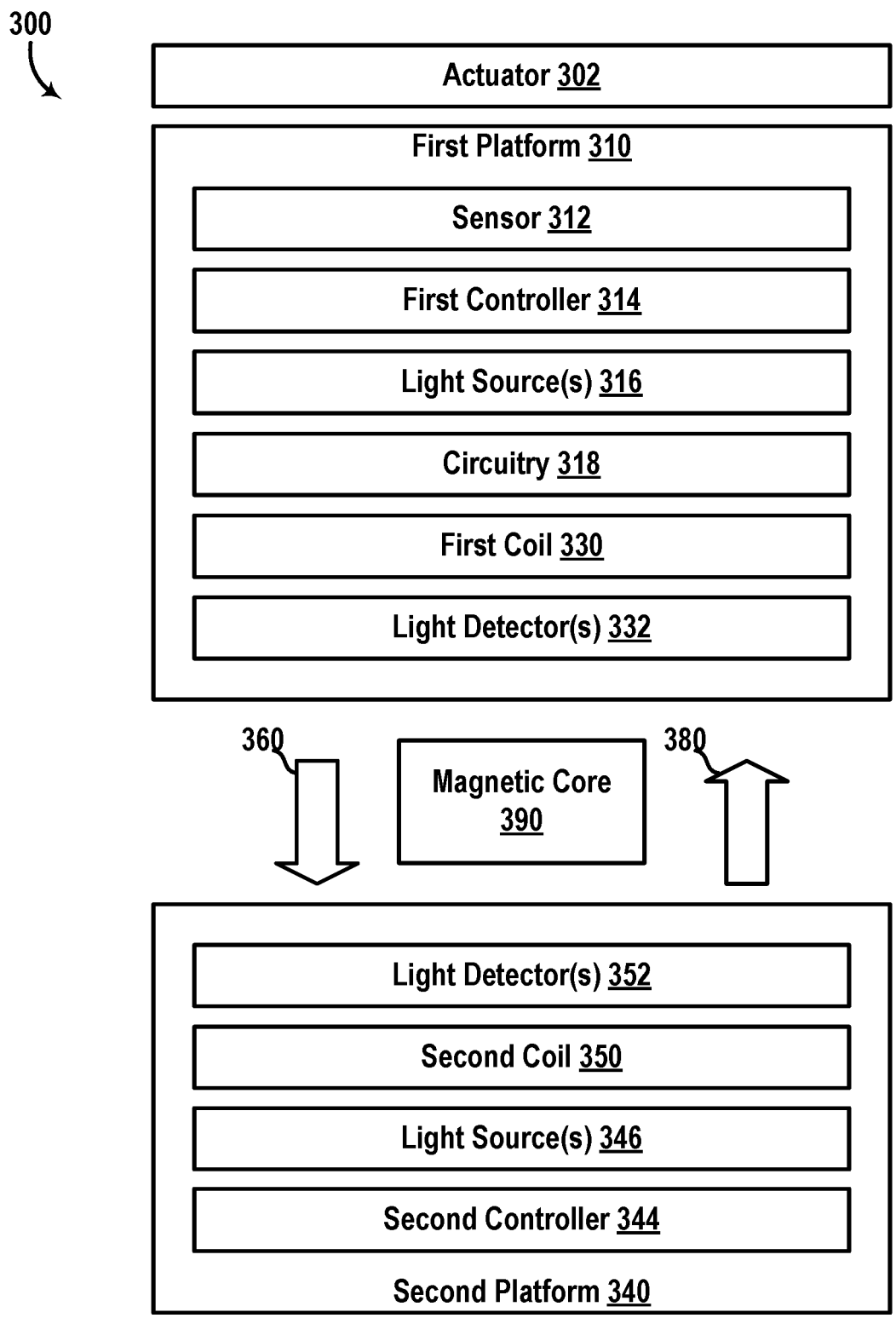
FIG. 3 is a simplified block diagram of a device that includes a rotary joint, according to an example embodiment.

FIG. 3 is a simplified block diagram of a device 300 that includes a rotary joint, according to an example embodiment. For example, device 300 can be used as an interface between moveable components of an electromechanical system, such as any of vehicles 100, 200, and/or any other electromechanical system. Thus, for instance, device 300 can be physically implemented as a rotary joint that facilitates power transmission between two moveable components of the system (or subsystem), such as a rotating platform that mounts sensors included in sensor units 102, 104, 106, 108, 110, sensor system 204, among other examples. As shown, device 300 includes an actuator 302, a first platform 310, a second platform 340, and a magnetic core 390.

Actuator 302 may be similar to the actuator(s) 236 of the vehicle 200, for example. To that end, actuator 302 may be configured to cause a relative rotation between first platform 310 (or one or more components thereof) and second platform 340 (or one or more components thereof). For instance, actuator 302 may be coupled to one or both of platforms 310, 340 (or one or more components thereof) to cause the relative rotation.

First platform 310 may comprise or may be coupled to a sensor mounting platform, and may be configured as a rotor or a stator in a rotary joint configuration. For example, actuator 302 may be configured to rotate platform 310 relative to platform 340 and about an axis of rotation of platform 310 (e.g., rotor axis, etc.). Alternatively or additionally, for example, actuator 302 could rotate platform 340 relative platform 310 about an axis of rotation of platform 340. Thus, within various examples, platform 310 can be configured as a rotating platform (e.g., rotor) or a stationary platform (e.g., stator) in a rotary joint configuration.

As shown, platform 310 includes a sensor 312, a first controller 314, one or more light sources 316, circuitry 318, a first coil 330, and one or more light detectors 332. In some examples, platform 310 may comprise any solid material suitable for supporting and/or mounting various components of platform 310. For instance, platform 310 may include a printed circuit board (PCB) that mounts light source(s) 316, coil 330, light detector(s) 332, and/or other components of platform 310. The PCB in this instance can be positioned such that the mounted components are along a side of platform 310 facing or opposite to a corresponding side of platform 340. With this arrangement, for instance, light source(s) 316 can emit light 360 for propagation toward second platform 340 and light detector(s) 332 can receive light 380 propagating from second platform 340 toward first platform 310.

Sensor 312 may include any combination of sensors mounted to first platform 310, such as one or more sensors of sensor system 204, one or more of the sensors included in vehicle 100, and/or any other sensor that can be mounted on platform 310. A non-exhaustive list of example sensors may include direction sensors (e.g., gyroscopes), remote sensing devices (e.g., RADARs, LIDARs, etc.), sound sensors (e.g., microphones), among others.

First controller 314 may be configured to operate one or more of the components of first platform 310. To that end, controller 314 may include any combination of general-purpose processors, special-purpose-processors, data storage, logic circuitry, and/or any other circuitry configured to operate one or more components of device 300. In one implementation, similarly to computing system 210, controller 314 includes one or more processors (e.g., processor 212) that execute instructions (e.g., instructions 216) stored in data storage (e.g., data storage 214) to operate sensor 312, light source(s) 316, etc. In another implementation, controller 314 alternatively or additionally includes circuitry wired to perform one or more of the functions and processes described herein for operating one or more of the components of device 300. In one example, controller 314 can be configured to receive sensor data collected by sensor 312, and to provide a modulated electrical signal indicative of the sensor data to light source(s) 316. For instance, the sensor data may indicate a measured orientation of sensor 312, a scan of a surrounding environment, detected sounds, and/or any other sensor output of sensor 312.

Light source(s) 316 may include one or more light sources arranged to emit or otherwise provide light beam(s) 360 incident on platform 340. To that end, light source(s) 316 may include laser diodes, light emitting diodes (LEDs), vertical cavity surface emitting lasers (VCSEL), organic light emitting diodes (OLEDs), polymer light emitting diodes (PLED), light emitting polymers (LEP), liquid crystal displays (LCD), microelectromechanical systems (MEMS), discharge light sources (e.g., fluorescent lamp, etc.), incandescent light sources (e.g., halogen lamp, filament lamp, etc.), combustion light sources, among other examples.

In a first implementation, light source(s) 316 comprise a plurality of light sources mounted in platform 310 in a substantially circular arrangement around an axis of rotation of the platform 310. The plurality of light sources may emit a plurality of light beams that diverge to form a ring-shaped light beam incident on platform 340 (and/or a component thereof). For example, platforms 310 and 340 can be positioned at a predetermined distance to one another. The predetermined distance can be selected according to the respective distances between adjacent light sources and/or beam divergences of the adjacent light sources. A beam divergence may be an angular measure of the increase in beam diameter or radius relative to a distance of propagation of light beam(s) 360. Thus, for instance, the predetermined distance can be selected to be greater than or equal to a distance at which adjacent light beams of light 360 intersect. In a second implementation, light source(s) 316 comprise a single ring-shaped light source. For instance, a single light source 316 can be implemented as an OLED patterned on a PCB layer in the shape of a ring. In a third implementation, light source(s) 316 comprise one or more light sources coupled to one or more optical elements (e.g., light diffusers, lens, filters, etc.) that are arranged to redirect or focus light beam(s) 360 to form a ring-shaped light beam.

Circuitry 318 may include any combination of wiring, conductive material, capacitors, resistors, amplifiers, filters, comparators, voltage regulators, controllers, and/or any other circuitry arranged to electrically couple one or more components of platform 310. In some examples, circuitry 318 could be arranged to condition electrical communication and power signals between two or more components of platform 310. For instance, circuitry 318 may include one or more voltage regulators that condition electrical power received via transformer coil 330 to power sensor 312, controller 314, light source(s) 316, and/or detector(s) 332, according to respective voltage inputs permitted by the respective components of platform 310.

First coil 330 may comprise one or more conductive loops concentrically arranged about an axis of rotation of platform 310 (and/or 340). In one implementation, first coil 330 may comprise a plurality of conductive loops in a coplanar arrangement around the axis of rotation. For instance, coil 330 can be implemented as a plurality of conductive tracks (e.g., copper, etc.) patterned along a single layer of a circuit board (e.g., PCB) that also mounts light source(s) 316. The PCB, for instance, may also include conductive tracks in the single layer that are coupled to light source(s) 316, detector(s) 332, etc. With this arrangement, for instance, assembly cost, maintenance cost, and space improvements can be achieved by implementing platform 310 (or a portion thereof) as a single mounting platform (e.g., circuit board) that includes a mounting surface for light source(s) 316, light detector(s) 322, etc., as well as coil 330 patterned along the same circuit board layer that includes conductive tracks (e.g., circuitry 318, etc.) coupling the various components of platform 310. Thus, in some examples, such PCB of platform 310 can be a replaceable, cost-effective, distance-calibrated component that is suitable for relatively small rotary joint implementations.

In some implementations, first coil 330 may also comprise a second plurality of conductive loops in another coplanar arrangement that is parallel to the coplanar arrangement of the (first) plurality of conductive loops. For example, coil 330 may include the second plurality of conductive loops patterned along a second layer of the circuit board (e.g., along an opposite side of a two-layer PCB, or along a middle layer of a multi-layer PCB, etc.). In this example, the conductive loops in each layer can be electrically coupled via an electrical contact (e.g., "via") that extends between one of the conductive loops in one layer and an adjacent (e.g., overlapping) conductive loop in the second layer. With this arrangement, for instance, the number of loops (e.g., transformer windings) in first coil 330 can be increased to allow a greater amount of power transmission between first coil 330 and a corresponding second coil in second platform 340. Additionally or alternatively, with this arrangement for instance, incorporating multiple loops (e.g., transformer windings) may allow device 300 to transform a voltage level of an induced electrical current flowing through coil 330 relative to a driving electrical current flowing through the corresponding second coil. Further, with this arrangement for instance, device 300 may allow an optimal use of copper (or other conductive material) included in a cross sectional area of platform 310 (e.g., circuit board, etc.) surrounding the axis of rotation of platform 310 to increase the amount and efficiency of power transmission between platforms 310 and 340.

Detector(s) 332 may comprise one or more light detectors (e.g., photodetectors) that convert light 380 into a signal (e.g., a voltage and/or current signal) that can be measured via controller 314. To that end, light detector(s) or photodetector(s) 332 may include any combination of light sensors such as photodiodes, photoemission sensors, photoelectric sensors, photovoltaic sensors, thermal sensors, polarization sensors, photochemical sensors, among others. In some examples, detector(s) 332 may be configured to detect light at a particular wavelength or within a particular bandwidth associated with light 380. Thus, for example, device 300 can be less sensitive to noise (e.g., environmental light) that is not within a predetermined wavelength range associated with light 380.

In some implementations, detector(s) 332 remains at least partially overlapping light beam 380 in response to actuator 302 rotating platform 310 relative to platform 340. For example, light beam 380 may have a ring shape or other continuous shape (e.g., a combination of adjacent light beams that intersect at or prior to arrival at platform 310, etc.) extending around an axis of rotation of platform 310. In this example, detector 332 can be positioned at a particular distance to the axis of rotation such that detector 332 overlaps (at least partially) light beam(s) 380 at any orientation of platform 310 about the axis of rotation. Thus, for example, where light beam 380 is a modulated light beam (e.g., sequence of light pulses, etc.) indicating wirelessly transmitted data from platform 340, detector 332 can continue to detect the modulated light beam even as platform 310 rotates relative to platform 340.

Platform 340 may be configured as a rotor or a stator, similarly to the various configurations described for platform 310. As shown, platform 340 includes a second controller 344, one or more light sources 346, a second coil 350, and one or more light detectors 352. In some examples, platform 340 may also include an orientation sensor (not shown), such as an encoder, range sensor, etc., that provides a measure of an orientation of platform 310 relative to platform 340 (e.g., about an axis of rotation of platform 310).

Controller 344 can have various physical implementations (e.g., processors, logic circuitry, data storage, etc.) similarly to controller 314, for example. Further, controller 344 can operate light source(s) 346 to transmit a modulated light signal 380 indicating a transmission of data or instructions similarly to, respectively, controller 314, light source(s) 316, and light signal 360. For instance, controller 344 can provide a modulated electrical signal to cause light source(s) 346 to provide modulated light 380 indicating instructions for operating sensor 312 and/or any other component (e.g., actuator 302, etc.) coupled to platform 310. Further, for instance, controller 344 can receive a modulated electrical signal from detector(s) 352 indicating modulated light 360. To that end, for instance, modulated light 360 may indicate sensor data collected by sensor 312 and transmitted, via light 360, to platform 340.

Further, similarly to first coil 330, second coil 350 may include one or more conductive loops concentrically arranged in one or more coplanar arrangements around an axis of rotation of platform 310 (and/or 340). Further, for example, coil 350 can be arranged to overlap opposite to coil 330 at the predetermined distance between platforms 310 and 340. In one implementation, device 300 may cause an electrical current to flow through coil 350. As a result, coil 350 may generate a magnetic field extending through a center of coil 350 toward a center of coil 330. A portion of the magnetic field extending through coil 330 may then induce an electrical current flowing through coil 330, which can be harvested to power various components (e.g., sensor 312, light source(s) 316, etc.) coupled to platform 310, for instance.

Accordingly, light source(s) 346, coil 350, and detector(s) 352 can be configured, physically implemented, and/or arranged, etc., in a similar manner to, respectively, light source(s) 316, coil 330, and detector(s) 332. By way of example, a circuit board implementation of platform 340 can be substantially similar to a circuit board implementation of platform 310. As a result, assembly and maintenance cost improvements for device 300 can be achieved by physically implementing a replaceable circuit board that can be used for either platform.

However, in some examples, one or more components of platform 340 can have different characteristics than corresponding components of platform 310. In one example, light source(s) 346 can be implemented to include a different number of light sources or may emit light 380 having different wavelengths, among other possibilities (e.g., different phases, polarizations, intensities, etc.). In another example, transformer coil 330 may include a different number of conductive loops than transformer coil 350. Other examples are possible.

As noted above, in some implementations, platform 310 is positioned at a first predetermined distance to platform 340 to facilitate formation of ring-shaped light beam 360 incident on platform 340 for detection by detector 352. By way of example, where light sources 316 comprise a plurality of light sources in a circular arrangement, the first predetermined distance may be greater than or equal to a given distance at which adjacent diverging light beams of light 360 intersect to form ring-shaped light beam 360 prior to or at arrival of light beam 360 to a surface of platform 340. Thus, in this example, detector(s) 352 may remain at least partially overlapping light 360 at any orientation of platform 310 around its axis of rotation. Further, as the first predetermined distance increases, a cross-sectional area of diverging ring-shaped light beam 360 incident on platform 340 may increase, which may thereby increase an availability of positions along a mounting surface of platform 340 for placement of detector(s) 352 to remain at least partially overlapping light 360 in response to rotation of platform 310.

However, as the first predetermined distance between platforms 310 and 340 increases, the power transmission efficiency between coils 330 and 350 may decrease due to divergence of the magnetic field generated by coil 350. For instance, as the first predetermined distance increases, a larger portion of the generated magnetic field may diverge away from the center of coil 330. As a result, a smaller amount of power may be transmitted as electrical current flowing through coil 330 due to a smaller portion of the generated magnetic field (e.g., lower magnetic flux density, etc.) extending through the center of coil 330.

Accordingly, device 300 can optionally include magnetic core 390 configured to guide a magnetic field generated by coil 350 through coil 330. To that end, core 390 can be formed from a ferromagnetic material such as iron, ferromagnetic compounds, ferrites, etc. For example, core 390 may comprise a material having a high magnetic permeability relative to surrounding air to cause a relatively larger portion of magnetic field lines generated by coil 350 to be concentrated inside core 390. Further, in some implementations, core 390 can be arranged to extend through coil 330 and/or 350. For instance, core 390 can be implemented as a cylindrical structure extending along the axis of rotation of platform 310 and through one or more of coils 330, 350. With this arrangement, for instance, a surface of magnetic core 390 may remain within a second predetermined distance to coil 330 and/or 350 in response to a rotation of platform 310 about the axis of rotation. Further, for example, the second predetermined distance can be less than the first predetermined distance between the two platforms 310 and 340. Thus, with this arrangement for instance, device 300 can mitigate the effect of the larger first predetermined distance between platforms 310 and 340 by guiding the generated magnetic field (through core 390) toward coil 330.

In some implementations, device 300 may include fewer components than those shown. For example, device 300 can be implemented without light source(s) 346, detector(s) 352, etc. Further, in some implementations, device 300 may include one or more components in addition to or instead of those shown. For example, platforms 310 and/or 340 may include additional or alternative sensors (e.g., microphone 256, etc.), computing subsystems (e.g., navigation system 248, etc.), communication interfaces (e.g., wireless communication system 252, etc.), and/or any other component such as any of the components of vehicles 100 and 200. Thus, in some examples, device 300 can facilitate one way or two way communication between any number of devices (respectively distributed or coupled to platforms 310 and 340) via an optical communication path defined by light signals 360, 380, while also transmitting power from a stator platform (e.g., platform 340) to a rotor platform (e.g., platform 310) to power the various components coupled to the rotor platform.

Figure 4A:
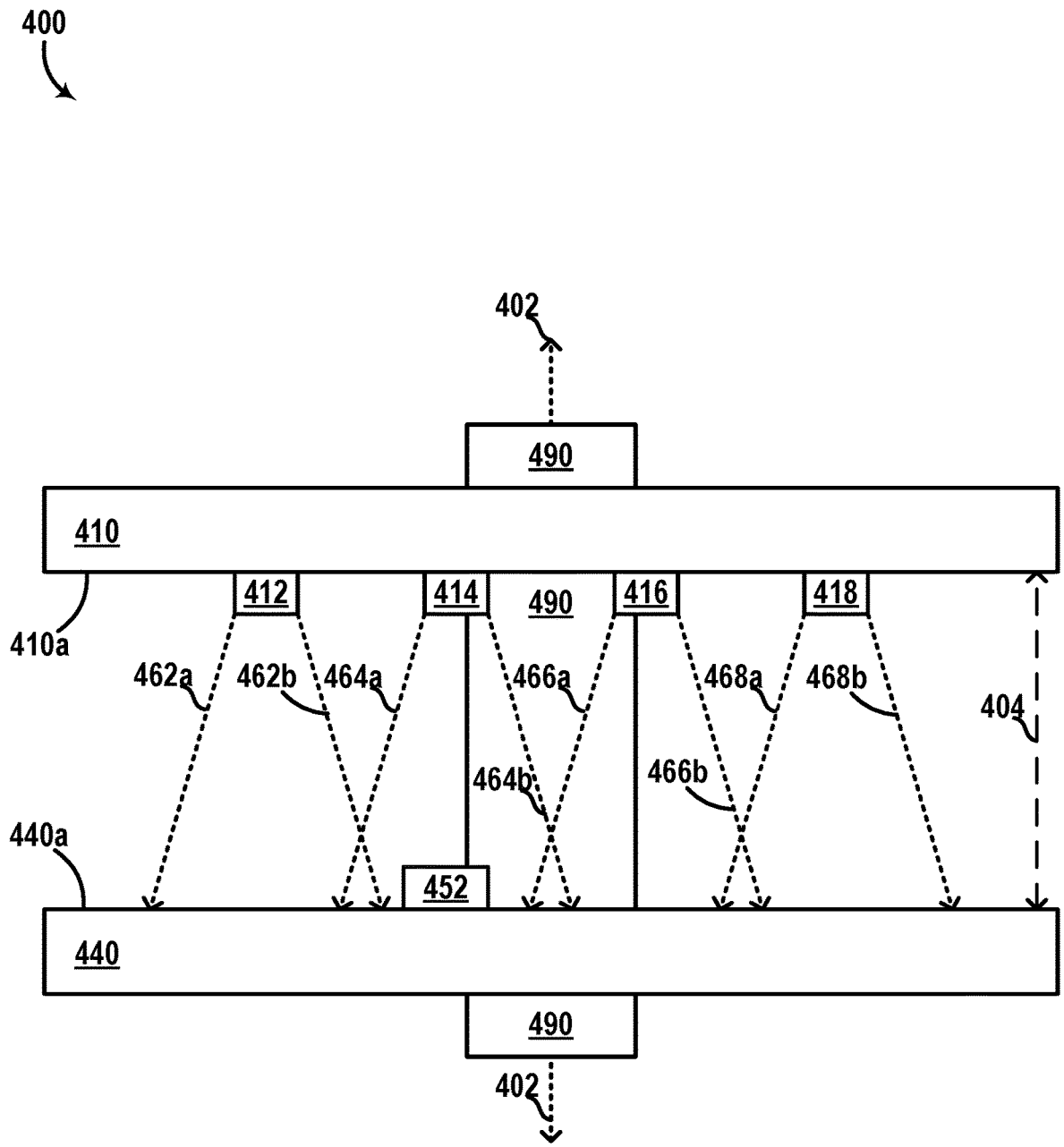
FIG. 4A illustrates a side view of a device that includes a rotary joint, according to an example embodiment.

FIG. 4A illustrates a side view of a device 400 that includes a rotary joint, according to an example embodiment. For example, device 400 may be similar to device 300, and can be used with an electromechanical system such as vehicles 100 and 200. As shown, device 400 includes platforms 410 and 440 that may be similar, respectively, to platforms 310 and 340. Further, as shown, device 400 also includes a plurality of light sources 412, 414, 416, 418 that may be similar to light source(s) 316. Further, as shown, device 400 includes light detector 452 that may be similar to detector(s) 352. Further, as shown, device 400 includes a magnetic core 490 extending through platforms 410 and 440. Core 490 can be similar to core 390, for example. In the example shown, a side 410a of platform 410 is positioned at a predetermined distance 404 to a side 440a of platform 440. In some examples, side 410a may correspond to a planar mounting surface of platform 410 (e.g., for mounting light sources 412, 414, 416, 418, etc., in a coplanar arrangement). Similarly, for example, side 440a may correspond to a planar mounting surface of platform 440 (e.g., for mounting detector 452 opposite to the light sources of platform 410). It is noted that some components of device 400 are omitted from the illustration of FIG. 4A for convenience in description. For example, FIGS. 4B and 4C illustrate cross-section views of device 400.

Figure 4B:
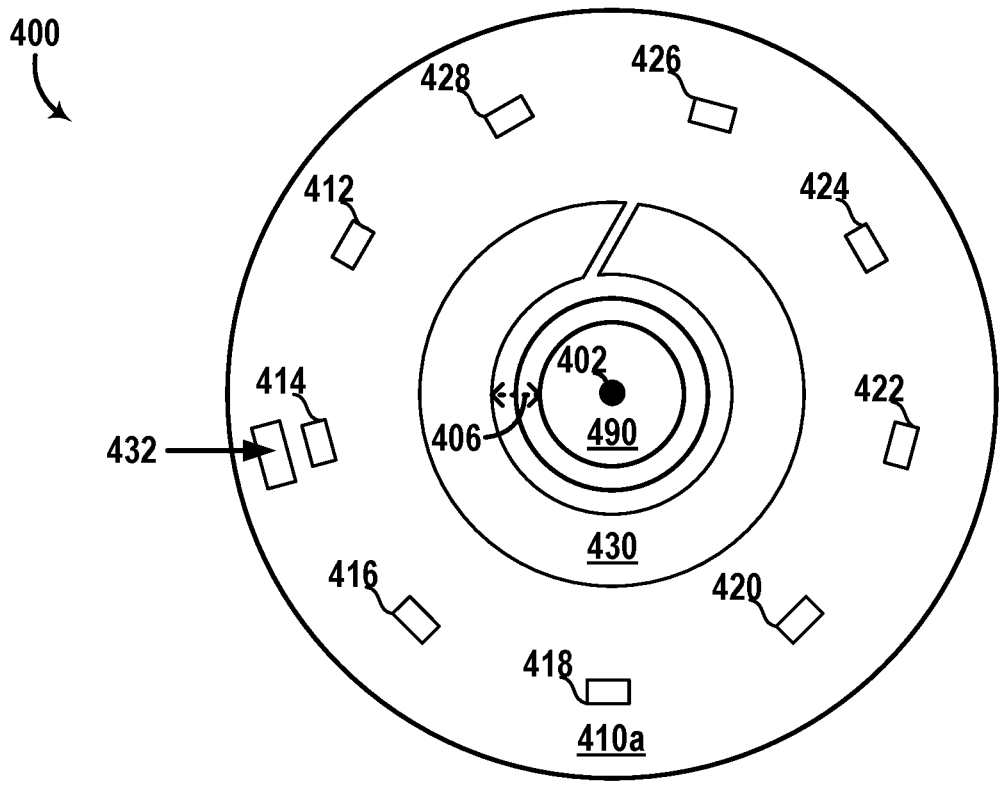
FIG. 4B illustrates a cross-section view of the device shown in FIG. 4A.

In the cross section view shown in FIG. 4B, side 410a of platform 410 is pointing out of the page. As shown in FIG. 4B, device 400 also includes detector 432 that may be similar to detector 332, for example. Further, as shown, device 400 also includes light sources 420, 422, 424, 426, 428 that are arranged (along with light sources 412-418) in a substantially circular arrangement around axis of rotation 402 of platform 410. Further, as shown, device 400 also includes coil 430 disposed along planar mounting surface 410a around axis of rotation 402 of platform 410. For example, coil 430 may be similar to coil 330. Further, as shown, core 490 may have a cylindrical surface that remains within a predetermined distance 406 to coil 430 in response to rotation of platform 410 about axis of rotation 402. For example, core 490 could have an axis of cylinder aligned with axis of rotation 402 to facilitate coil 430 remaining within the distance 406 to core 490 as platform 410 rotates about axis 402.

Figure 4C:
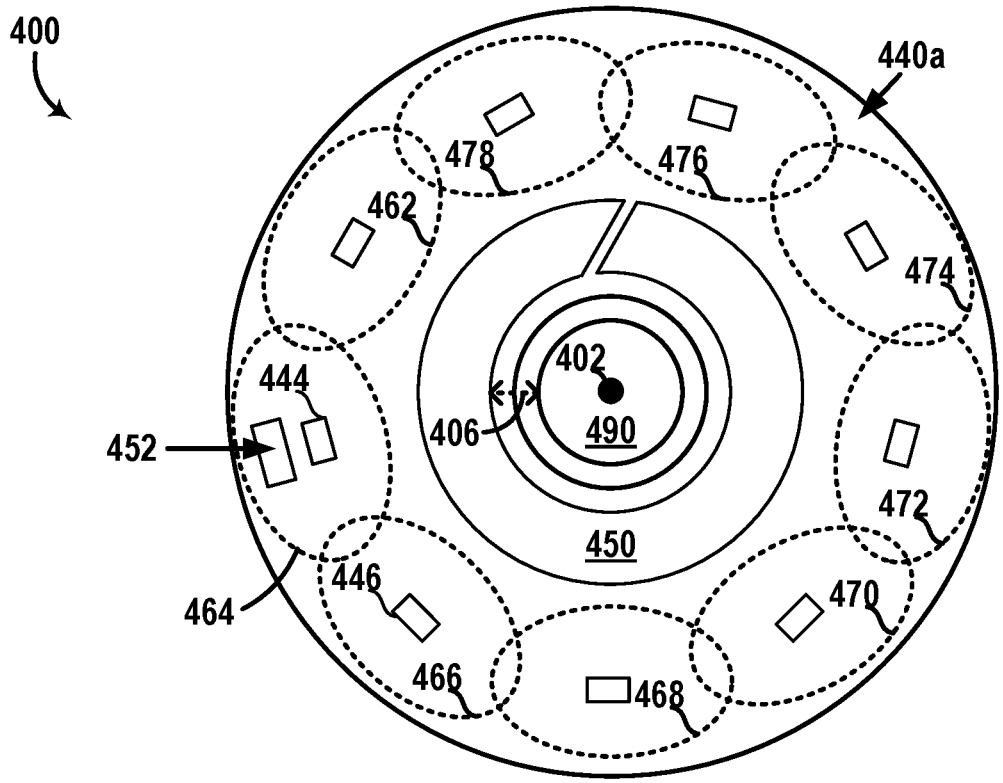
FIG. 4C illustrates another cross-section view of the device shown in FIG. 4A.

In the cross section view shown in FIG. 4C, side 440a of platform 440 is pointing out of the page. As shown, platform 440 may also include a plurality of light sources, exemplified by light sources 444 and 446, which are also arranged in a circular arrangement around axis of rotation 402. Thus, in some examples, similarly to device 300, device 400 can be configured for two-way communication between platforms 410 and 440. For instance, light sources 412-428 of platform 410 can be configured to emit light propagating toward detector 452 of platform 440. Similarly, for instance, light sources of platform 440 (e.g., light sources 444, 446, etc.) can be configured to emit light propagating toward detector 432 of platform 410.

Further, as shown, device 400 also includes coil 450 disposed along planar mounting surface 440a around axis of rotation 402 of platform 410. For example, coil 450 may be similar to coil 350, and can be arranged to remain at least partially overlapping coil 430 in response to rotation of platform 410 about axis 402. In some examples, similarly to device 300, device 400 can be configured to cause an electrical current to flow through coil 450. As a result, coil 450 may generate a magnetic field that induces a corresponding electrical current to flow through coil 430. The induced electrical current can then be conditioned to provide power to various components (e.g., light sources 412-418) mounted to or otherwise coupled to platform 410. Further, similarly to coil 430, coil 450 may be configured to remain within distance 406 to core 490 in response to rotation of platform 410 about axis 402. For instance, coils 430 and 450 can be coaxially arranged about axis 402 (e.g., axis of cylinder of core 490) such that both coils remain within distance 406 to core 490 in response to rotation of platform 410 about axis 402.

Referring back to FIG. 4A, light sources 412, 414, 416, 418 may respectively emit a plurality of light beams 462 (extending between arrows 462a and 462b), 464 (extending between arrows 464a and 464b), 466 (extending between arrows 466a and 466b), and 468 (extending between arrows 468a and 468b). Further, as shown, adjacent light beams may intersect at or prior to arrival of the respective light beams at side 440a (and/or detector 452) of platform 440 to form a combined (e.g., continuous, etc.) light beam. As shown in FIG. 4B, for instance, light sources 420, 422, 424, 426, 428 can also emit light beams that intersect with respective adjacent light beams, similarly to light beams 462-468 emitted by light sources 412-418. As shown in FIG. 4C, for instance, light beams 470, 472, 474, 476, 478 that arrive at platform 440 may correspond, respectively, to light beams emitted by light sources 420, 422, 424, 426, 428. Together, for instance, light beams 462-478 may combine prior to propagation for predetermined distance 404 from platform 410 to form a continuous ring-shaped light beam extending around axis of rotation 402 as shown in FIG. 4C.

Thus, in line with the discussion above, detector 452 may continue to receive the combined light beam as platforms 410 and/or 440 rotate with respect to one another (e.g., about axis of rotation 402). By way of example, platform 410 and/or 440 can be rotated such that first side 410a and second side 440a remain within predetermined distance 404 to one another. For instance, platform 410 could be rotated about the shared (e.g., center) axis 402, while substantially remaining at least at predetermined distance 404 to platform 440. To that end, distance 404 could be any distance suitable for communication between one or more of light sources 412-428 and detector 452. For instance, as shown in FIG. 4A, distance 404 can be selected to be greater than a given distance at which adjacent light beams of light beams 462, 464, 466, 468 intersect. Alternatively, in another implementation (not shown), distance 404 can be selected to be equal to the given distance at which the adjacent light beams intersect. With either arrangement, the intersecting light beams can form a continuous or combined light beam incident on side 440a such that detector 450 (and/or 452) can remain overlapping the incident combined light beam as platform 410 rotates about axis 402.

The given distance at which adjacent light beams intersect, for instance, may depend on respective beam divergences of the adjacent light beams. The beam divergence of light beam 462, for instance, may correspond to the angle between arrows 462a and 462b and may be based on physical characteristics or a configuration of light source 412. For example, if the beam divergence of light beam 462 increases, then the distance (from side 410a) at which arrow 462b intersects with arrow 464a may decrease, and vice versa. Additionally or alternatively, for instance, the distance at which the adjacent light beams intersect may depend on a separation distance between adjacent light sources. For instance, if the separation distance between light sources 412 and 414 increases, then the distance (from side 410a) at which arrows 462b and 464a intersect may also increase. Accordingly, predetermined distance 404 can be based on an arrangement (e.g., separation distances) and/or beam divergence characteristics of light sources 412-428. Thus, in some examples, distance 404 can be adjusted by using fewer, more, or different light sources (e.g., having different beam divergences) than those shown, in accordance with various applications (e.g., size requirements, etc.) of device 400.

Additionally or alternatively, in some examples, detector 452 could be configured to remain overlapping the combined light beam in response to a different type of relative motion (e.g., other than a rotation) between platforms 410 and 440 even if the motion causes a change to distance 404. By way of example, an actuator (not shown) of device 400 could be configured to adjust the position of platform 410 along a translational path (e.g., along axis 402, along another linear axis, etc.), or other path (e.g., elliptical path, curved path, etc.). For instance, device 400 may be included in a computer numeric control (CNC) machine or a 3D printer that operates a tool (e.g., drill, saw, printer head, etc.) via a robotic arm or other hardware component. In this instance, platform 410 may be coupled to the tool, and platform 440 may be coupled to a controller (and/or an actuator) that adjusts the position of platform 410 linearly along axis 402. In this instance, device 400 may be configured to restrict linear motion of platform 410 along axis 402 such that distance 404 remains sufficiently large for beams 462-468 to intersect prior to arrival of beams 462-468 at second side 440a (and/or detector 452). By doing so, for example, detector 452 may continue to receive the combined light beam as platforms 410 and/or 440 are linearly (or otherwise) displaced with respect to one another.

As noted above, in some scenarios, distance 404 may be selected to remain sufficiently large such that light beams 462-478 intersect to form a ring-shaped light beam incident on platform 440 (e.g., so that detector 452 remains overlapping the ring-shaped light beam as platform 410 rotates about axis 402). However, in some instances, the density of a magnetic field generated by coil 450 and extending through coil 430 may be directly proportional to distance 404 between the two platforms 410 and 440. As a result, the efficiency of power transmission from platform 440 to 410 can be affected by distance 404.

To mitigate the effect of distance 404, as shown, core 490 can be arranged to remain within a smaller distance 406 to both coils 430 and 450 in response to a relative motion (e.g., rotation, linear displacement, other motion, etc.) between platforms 410 and 440. Thus, in some instances, distance 406 may remain substantially unchanged even in scenarios where distance 404 changes. Further, similarly to core 390, core 490 can guide the magnetic field generated by coil 450 to extend through coil 430 (and within a small distance 406 to coil 430) regardless of distance 404 between the two platforms 410 and 440. With this arrangement, device 400 can provide efficient power transmission from platform 440 to platform 410 regardless of distance 404 between the two platforms. In one embodiment, distance 404 is approximately 1520 millimeters, distance 406 is approximately 0.5 millimeters, and transformer coils 430 and 450 facilitate transmission of at least 24 Watts of power. However, other distances and transmission powers are possible as well depending on various applications of device 400.

It is noted that the shapes, dimensions, and relative positions shown in FIGS. 4A-4C for device 400 and/or the various components thereof are not necessarily to scale and are only illustrated as shown for convenience in description. Thus, in some implementations, device 400 and/or one or more components thereof can have other forms, shapes, arrangements, and/or dimensions as well.

It is also noted that device 400 may include fewer or more components than those shown, such as any of the components of device 300 (e.g., actuators, sensors, controllers, etc.), among other possibilities. In one example, although device 400 is shown to include nine light sources mounted on each platform, device 400 can alternatively include more or fewer light sources. In another example, light sources 412-418 can be replaced with a single ring-shaped light source extending around axis 402 to provide a continuous (ring-shaped) light beam around axis 402. In yet another example, one or more light sources can be optically coupled to a light diffuser that redirects and/or focuses light from the light source(s) to form a ring-shaped light beam incident on platform 440. In still another example, although coil 430 (and 450) are respectively shown to include a single conductive loop, coil 430 and/or 450 can alternatively be implemented to include one or more additional conductive loops that are coplanar (e.g., conductive tracks along a single layer of a circuit board) and/or on a different geometric plane (e.g., conductive tracks along multiple layers of a circuit board).

Figure 5:
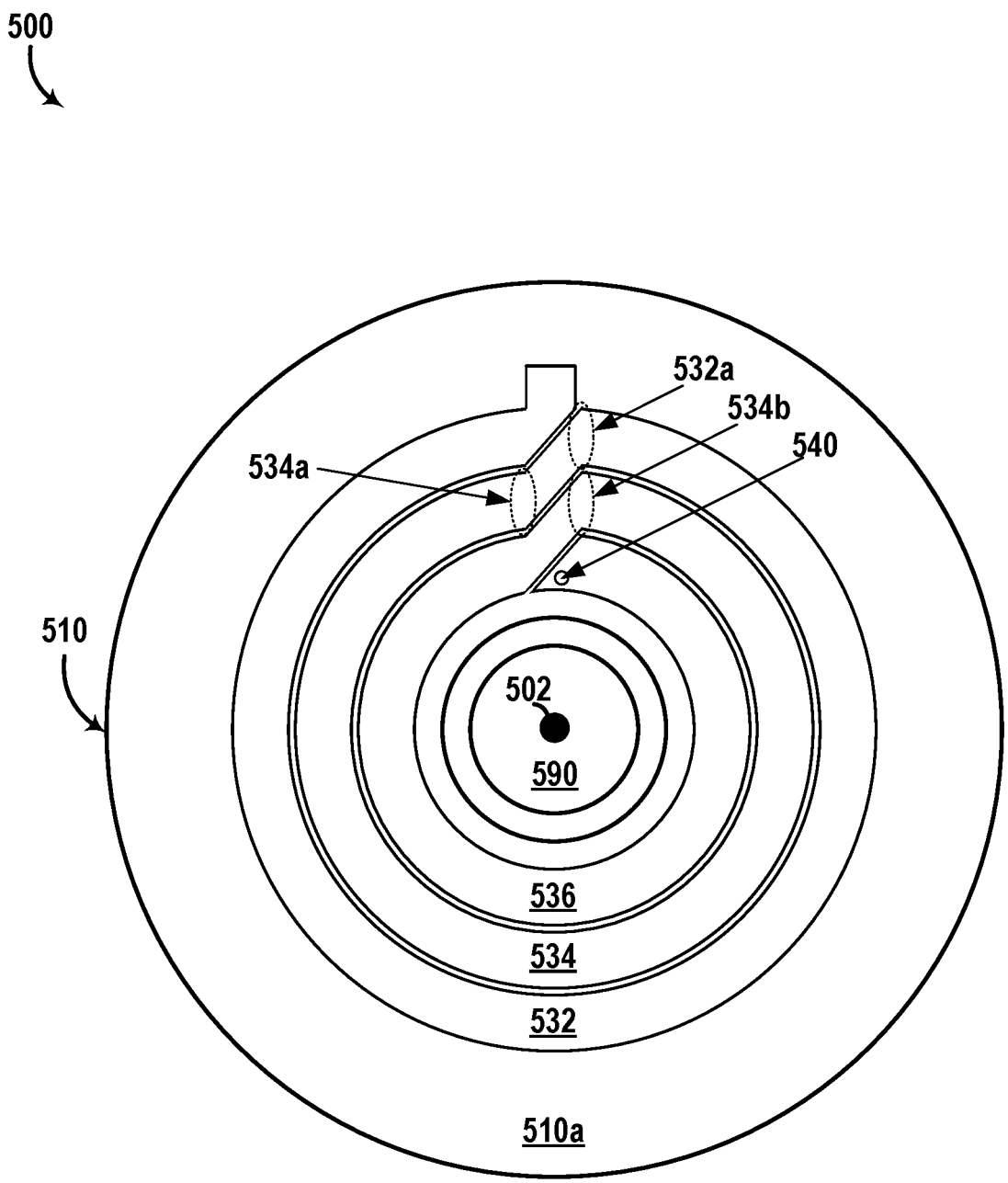
FIG. 5 illustrates a cross section view of another device that includes a rotary joint, according to an example embodiment.

FIG. 5 illustrates a cross-section view of another device 500 that includes a rotary joint, according to an example embodiment. Device 500 may be similar to device 400. For example, the cross-section view of device 500 shown may be similar to the view of device 400 shown in FIG. 4B. To that end, as shown, device 500 may include a planar mounting surface 510a (e.g., the side pointing out of the page) of a platform 510 that is similar to side 410a of platform 410. Further, for example, platform 510 may be configured to rotate about an axis of rotation 502 relative to another platform (not shown), similarly to rotation of platform 410 about axis 402. Further, as shown, device 500 includes a magnetic core 590 that may be similar to core 490 of device 400.

However, unlike device 400, device 500 includes a plurality of conductive loops 532, 534, 536 in a coplanar arrangement substantially parallel to side 510a of platform 510. By way of example, conductive loops 532, 534, 536 can be formed as conductive tracks patterned along a layer of a circuit board (e.g., PCB), similarly to coils 330, 350, 430, and 450. Together, conductive loops 532, 534, 536 form a multi-loop coil in which the plurality of conductive loops are concentric around axis of rotation 502 of platform 510. As shown, for instance, conductive loop 534 includes a substantially circular-arc shaped segment of conductive material extending between ends 534a and 534b, and having a center axis that is aligned along axis of rotation 502. Further, as shown, the multi-loop coil includes a segment of conductive material that extends from end 534b of loop 534 to end 532a of loop 532.

As shown, the plurality of conductive loops 532, 534, 536 are arranged in a coplanar arrangement along a first geometric plane (e.g., a surface of side 510a, etc.). In some examples, the multi-loop coil may also include one or more additional conductive loops (not shown) that are arranged in a coplanar arrangement along a second geometric plane that is substantially parallel to the first geometric plane. For example, the one or more additional conductive loops can be arranged similarly to loops 532, 534, 536 along a side of platform 510 that is opposite to side 510a (e.g., an opposite side of a circuit board).

Alternatively, the one or more additional conductive loops can be arranged along a layer inside platform 510. For instance, platform 510 may comprise a multi-layer PCB, and the additional loops can be patterned as tracks along any one of the PCB layers. To facilitate this, device 500 may include an electrical contact 540 that couples conductive loop 536 to a corresponding loop (not shown) along the second geometric plane (not shown). Electrical contact 540, for example, may include a conductive material that extends through the page toward an adjacent overlapping conductive loop (not shown) that is similar to loop 536. For instance, electrical contact 540 can be implemented as a "via" in a PCB, or conductive material that is deposited through a drilled hole between two layers of the PCB.

In some implementations, a multi-loop coil can be used with device 400 instead of a single-loop coil (e.g., coil 430) to provide an induced electrical current based on a magnetic field extending through core 490 for power reception. Alternatively or additionally, in some implementations, a multi-loop coil can be used instead of a single-loop coil (e.g., coil 450) to generate a magnetic field through magnetic core 490 for power transmission. A multi-loop coil may be able to support transmission or reception of a greater amount of power than a single-loop coil. Accordingly, in some implementations, one or both of coils 430 and 450 may be a multi-loop coil that includes a plurality of conductive loops.

It is noted that device 500 may include additional components such as controllers, light sources, detectors, etc., and/or any other component included in devices 300 and 400.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A device comprising:
   a rotor platform that rotates about an axis of rotation, the rotor platform including a rotor planar mounting surface;
   a rotor coil comprising a first plurality of conductive loops disposed along the rotor planar mounting surface;
   a stator platform including a stator planar mounting surface;
   a stator coil comprising a second plurality of conductive loops disposed along the stator planar mounting surface; and
   a plurality of light sources on at least one of the rotor planar mounting surface or the stator planar mounting surface, for emitting light toward the other of the rotor planar mounting surface or the stator planar mounting surface,
   wherein at least one of the first plurality of conductive loops of the rotor coil or the second plurality of conductive loops of the stator coil are patterned on a printed circuit board (PCB) and concentrically arranged about the axis of rotation.

2. The device of claim 1, further comprising:
   a magnetic core extending along the axis of rotation.

3. The device of claim 2, wherein the magnetic core extends through the stator coil.

4. The device of claim 2, wherein the magnetic core remains within a given distance to the stator coil in response to rotation of the rotor platform about the axis of rotation.

5. The device of claim 2, wherein the magnetic core extends through the rotor coil.

6. The device of claim 2, wherein the magnetic core remains within a given distance to the rotor coil in response to rotation of the rotor platform about the axis of rotation.

7. The device of claim 1, wherein the rotor coil and the stator coil are coaxially arranged about the axis of rotation.

8. The device of claim 1, wherein the stator coil remains within a given distance to the rotor coil in response to rotation of the rotor platform about the axis of rotation.

9. The device of claim 1,
   wherein the plurality of light sources are in a circular arrangement about the axis of rotation.

10. The device of claim 9, wherein the plurality of light sources emit a plurality of diverging light beams toward the other of the rotor planar mounting surface or the stator planar mounting surface, wherein adjacent light beams of the plurality intersect to form a ring-shaped light beam incident on the other of the rotor planar mounting surface or the stator planar mounting surface.

11. The device of claim 10, further comprising:
   a light detector mounted on the other of the rotor planar mounting surface or the stator planar mounting surface, wherein the light detector remains at least partially overlapping the ring-shaped light beam in response to rotation of the rotor platform about the axis of rotation.

12. The device of claim 1, wherein the rotor planar mounting surface remains substantially parallel to the stator planar mounting surface in response to rotation of the rotor platform about the axis of rotation.

13. The device of claim 1, further comprising:
   a sensor mounted on the rotor platform.

14. The device of claim 13, further comprising:
   circuitry coupled to the rotor coil, wherein the circuitry conditions an induced electrical current flowing through the rotor coil, wherein the induced electrical current is based on a corresponding electrical current flowing through the stator coil, and wherein the circuitry provides the conditioned electrical current to power the sensor.

15. A device comprising:
   a first platform having a first side;
   a second platform having a second side positioned to overlap the first side of the first platform;
   an actuator that rotates the first platform relative to the second platform and about an axis of rotation of the first platform;
   a first coil included in the first platform, the first coil comprising a first plurality of conductive loops in a first coplanar arrangement substantially parallel to the first side;
   a second coil included in the second platform, the second coil comprising a second plurality of conductive loops in a second coplanar arrangement substantially parallel to the second side; and
   a plurality of light sources included in at least one of the first platform or the second platform, for emitting light toward the other of the first platform or the second platform,
   wherein at least one of the first plurality of conductive loops of the first coil or the second plurality of conductive loops of the second coil are patterned on a printed circuit board (PCB) and concentrically arranged about the axis of rotation.

16. The device of claim 15, further comprising:
   a magnetic core extending through the first coil and the second coil.

17. The device of claim 16, wherein a surface of the magnetic core adjacent to the first coil remains within a given distance to the first coil in response to the actuator rotating the first platform.

18. The device of claim 17, wherein the surface of the magnetic core has a substantially cylindrical shape defined by an axis of cylinder aligned with the axis of rotation of the first platform.

19. The device of claim 17, wherein the surface of the magnetic core also remains within the given distance to the second coil in response to the actuator rotating the first platform.

20. The device of claim 15, wherein the first side remains within a given distance to the second side in response to the actuator rotating the first platform.

21. The device of claim 15, wherein the first plurality of conductive loops of the first coil is coplanar along a first geometric plane, and wherein the first coil further comprises a third plurality of conductive loops in a coplanar arrangement along a second geometric plane that is substantially parallel to the first geometric plane.

22. The device of claim 21, further comprising:
an electrical contact that electrically couples the first plurality of conductive loops to the third plurality of conductive loops, the electrical contact extending between a first conductive loop of the first plurality of conductive loops and a second conductive loop of the third plurality of conductive loops.

23. The device of claim 22, wherein the first conductive loop overlaps the second conductive loop.

24. The device of claim 15, wherein the first platform comprises the PCB, wherein the first plurality of conductive loops comprise conductive tracks patterned along a single layer of the PCB.

25. The device of claim 15, wherein the first plurality of conductive loops comprise:
a first conductive loop having a first substantially circular-arc shaped segment of conductive material, wherein a center axis of the circular-arc shaped segment is aligned along the axis of rotation of the first platform; and
a second conductive loop having a second substantially circular-arc shaped segment of conductive material concentrically arranged with the first conductive loop about the center axis.

26. The device of claim 25, wherein the first plurality of conductive loops further comprise:
a segment of conductive material extending from an end of the first substantially circular-arc shaped segment to an end of the second substantially circular-arc shaped segment.

27. The device of claim 15, wherein the plurality of light sources are mounted in a circular arrangement about the axis of rotation.

28. The device of claim 15, further comprising:
a light detector included in the other of the first platform or the second platform and configured to receive light emitted by at least one of the plurality of light sources.

29. The device of claim 28, wherein the plurality of light sources emit a plurality of diverging light beams toward the other of the first platform or the second platform,
wherein the plurality of light beams intersect to form a ring-shaped light beam incident on the other of the first platform or the first platform, and
wherein the light detector remains at least partially overlapping the ring-shaped light beam in response to the actuator rotating the first platform about the axis of rotation.

30. A device comprising:
a rotor platform that rotates about an axis of rotation;
a rotor printed circuit board (PCB) mounted to the rotor platform;
a stator platform;
a stator PCB mounted to the stator platform;
a rotor coil comprising a first plurality of conductive loops patterned along a single layer of the rotor PCB;
a stator coil comprising a second plurality conductive loops patterned along a single layer of the stator PCB; and
a plurality of light sources on at least one of the rotor PCB or the stator PCB for emitting light toward the other of the rotor PCB or the stator PCB,
wherein at least one of the first plurality of conductive loops patterned along the single layer of the rotor PCB or the second plurality of conductive loops patterned along the single layer of the stator PCB are concentrically arranged about the axis of rotation.

31. The device of claim 30, further comprising:
a magnetic core extending through the rotor coil and the stator coil.

32. The device of claim 31, wherein a surface of the magnetic core remains at a first distance to the rotor coil and the stator coil responsive to rotation of the rotor coil about the axis of rotation.

33. The device of claim 32, wherein the rotor PCB remains at a second distance to the stator PCB in response to rotation of the rotor platform about the axis of rotation.

34. The device of claim 30, wherein the rotor coil and the stator coil are concentrically arranged about the axis of rotation such that the rotor coil remains at least partially overlapping the stator coil responsive to rotation of the rotor platform about the axis of rotation.

35. The device of claim 30, further comprising:
one or more additional conductive loops patterned along another single layer of the rotor PCB, wherein the one or more additional conductive loops are concentrically arranged about the axis of rotation of the rotor platform, and wherein the one or more conductive loops of the single layer overlap the one or more additional conductive loops of the other single layer.

36. The device of claim 35, further comprising:
an electrical contact electrically coupling the first plurality of conductive loops in the single layer of the rotor PCB to the one or more additional conductive loops of the other single layer.

37. The device of claim 30,
wherein the plurality of light sources are mounted in a circular arrangement about the axis of rotation.

38. The device of claim 37, wherein the plurality of light sources emit a plurality of diverging light beams to form a ring-shaped light beam incident on the other of the rotor PCB and the stator PCB.

39. The device of claim 38, wherein a given light beam of the plurality intersects with an adjacent light beam of the plurality at a first distance from the rotor PCB or stator PCB on which the plurality of light sources are mounted, and wherein the first distance is less than a second distance between the rotor PCB and the stator PCB.

40. The device of claim 38, further comprising:
a light detector mounted to the other of the rotor PCB or the stator PCB, wherein the light detector remains at least partially overlapping the ring-shaped light beam in response to rotation of the rotor platform about the axis of rotation.

* * * * *